US008957884B2

(12) United States Patent
Yato et al.

(10) Patent No.: US 8,957,884 B2

(45) Date of Patent: Feb. 17, 2015

(54) INTEGRATED CIRCUIT DEVICE AND ELECTRONIC APPARATUS

(75) Inventors: Hidenori Yato, Hokuto (JP); Shigeaki Kawano, Chino (JP); Hiroshi Kiya, Suwa (JP); Keisuke Hashimoto, Chino (JP); Hiroaki Nomizo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 884 days.

(21) Appl. No.: 12/878,354

(22) Filed: Sep. 9, 2010

(65) Prior Publication Data

US 2011/0069052 A1 Mar. 24, 2011

(30) Foreign Application Priority Data

Sep. 24, 2009 (JP) ................................ 2009-219306

(51) Int. Cl.
*G09G 5/00* (2006.01)
*G06F 3/038* (2013.01)
*G09G 3/16* (2006.01)
*G09G 3/34* (2006.01)

(52) U.S. Cl.
CPC .................. *G09G 3/16* (2013.01); *G09G 3/344* (2013.01); *G09G 2310/0275* (2013.01)
USPC ............ 345/208; 345/205; 345/107; 345/204

(58) Field of Classification Search
USPC ................................. 345/204–215, 690–699
See application file for complete search history.

(56) References Cited

U.S. PATENT DOCUMENTS

| | | | | |
|---|---|---|---|---|
| 5,684,503 | A | 11/1997 | Nomura et al. | |
| 7,463,229 | B2 | 12/2008 | Morita | |
| 2002/0190974 | A1 * | 12/2002 | Morita | 345/208 |
| 2003/0020702 | A1 * | 1/2003 | Matsuyama | 345/204 |
| 2003/0067666 | A1 * | 4/2003 | Kawai | 359/296 |
| 2005/0200587 | A1 * | 9/2005 | Hwang | 345/96 |
| 2005/0280626 | A1 * | 12/2005 | Amundson et al. | 345/107 |
| 2006/0087488 | A1 * | 4/2006 | Ito | 345/103 |
| 2007/0002008 | A1 * | 1/2007 | Tam | 345/107 |
| 2007/0268232 | A1 * | 11/2007 | Ku et al. | 345/100 |
| 2007/0296680 | A1 * | 12/2007 | Lee et al. | 345/100 |
| 2008/0068316 | A1 * | 3/2008 | Maekawa | 345/87 |
| 2008/0150887 | A1 * | 6/2008 | Kim et al. | 345/107 |
| 2009/0009465 | A1 * | 1/2009 | Choi et al. | 345/107 |
| 2009/0179923 | A1 * | 7/2009 | Amundson et al. | 345/690 |
| 2009/0256799 | A1 * | 10/2009 | Ohkami et al. | 345/107 |
| 2009/0256868 | A1 * | 10/2009 | Low et al. | 345/691 |
| 2009/0267969 | A1 * | 10/2009 | Sakamoto | 345/690 |

FOREIGN PATENT DOCUMENTS

| | | |
|---|---|---|
| CN | 101165554 A | 4/2008 |
| JP | A-2001-228462 | 8/2001 |
| JP | A-2005-345624 | 12/2005 |
| JP | A-2008-158243 | 7/2008 |
| JP | A-2009-053639 | 3/2009 |
| JP | A-2010-044144 | 2/2010 |

* cited by examiner

*Primary Examiner* — Kent Chang
*Assistant Examiner* — William Lu
(74) *Attorney, Agent, or Firm* — Oliff PLC

(57) ABSTRACT

An integrated circuit device includes: a driving voltage output unit that outputs a driving voltage supplied to a segment electrode of an electro-optical panel; a display data storage unit that stores display data; and a driving waveform information output unit that outputs driving waveform information when a display state of the segment electrode is changed from a first display state corresponding to first display data to a second display state corresponding to second display data, wherein the driving voltage output unit outputs the driving voltage specified by the first display data and the second display data from the display data storage unit, and the driving waveform information from the driving waveform information output unit.

11 Claims, 10 Drawing Sheets

| | | Bit | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| Address | Timing Set | EOW | – | HiZ | TP | BB | BW | WB | WW | Wait Time | | | | | | | |
| 0x00 | T1(RT1) | 0 | – | 0 | 0 | 0 | 0 | 0 | 0 | 0 | 0 | 0 | 0 | 0 | 1 | 0 | 1 |
| 0x02 | T2(RT2) | 0 | – | 0 | 1 | 0 | 0 | 1 | 1 | 1 | 0 | 0 | 0 | 0 | 0 | 1 | 1 |
| 0x04 | T3(RT3) | 0 | – | 0 | 0 | 1 | 1 | 1 | 1 | 1 | 0 | 0 | 0 | 0 | 0 | 1 | 1 |
| 0x06 | T4(RT4) | 0 | – | 0 | 1 | 0 | 0 | 0 | 0 | 1 | 0 | 0 | 0 | 0 | 0 | 1 | 1 |
| 0x08 | T5(RT5) | 0 | – | 0 | 0 | 1 | 0 | 1 | 0 | 1 | 0 | 0 | 0 | 0 | 0 | 1 | 1 |
| 0x0a | T6(RT6) | 1 | – | 0 | 0 | 0 | 0 | 0 | 0 | 0 | 0 | 0 | 0 | 0 | 1 | 0 | 1 |
| 0x0b | T7(RT7) | 0 | – | 0 | 0 | 0 | 0 | 0 | 0 | 0 | 0 | 0 | 0 | 0 | 0 | 0 | 0 |
| 0x0c | T8(RT8) | 0 | – | 0 | 0 | 0 | 0 | 0 | 0 | 0 | 0 | 0 | 0 | 0 | 0 | 0 | 0 |
| 0x0d | T9(RT9) | 0 | – | 0 | 0 | 0 | 0 | 0 | 0 | 0 | 0 | 0 | 0 | 0 | 0 | 0 | 0 |
| 0x0e | T10(RT10) | 0 | – | 0 | 0 | 0 | 0 | 0 | 0 | 0 | 0 | 0 | 0 | 0 | 0 | 0 | 0 |
| 0x0f | T11(RT11) | 0 | – | 0 | 0 | 0 | 0 | 0 | 0 | 0 | 0 | 0 | 0 | 0 | 0 | 0 | 0 |
| 0x10 | T12(RT12) | 0 | – | 0 | 0 | 0 | 0 | 0 | 0 | 0 | 0 | 0 | 0 | 0 | 0 | 0 | 0 |

FIG. 6A

| Wait Time | | |
|---|---|---|
| D[7-4] | D[3-0] | Time [mS] |
| 0 | 5 | 4.88 |
| 8 | 3 | 127.93 |
| 8 | 3 | 127.93 |
| 8 | 3 | 127.93 |
| 8 | 3 | 127.93 |
| 0 | 5 | 4.88 |
| 0 | 0 | 0.00 |
| 0 | 0 | 0.00 |
| 0 | 0 | 0.00 |
| 0 | 0 | 0.00 |
| 0 | 0 | 0.00 |
| 0 | 0 | 0.00 |

FIG. 6B

| | | Bit | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| Address | Timing Set | EOW | – | HiZ | TP | BB | BW | WB | WW | Wait Time | | | | | | | |
| 0x00 | T1(RT1) | 0 | – | 0 | 0 | 0 | 0 | 0 | 0 | 0 | 0 | 0 | 0 | 0 | 1 | 0 | 1 |
| 0x02 | T2(RT2) | 0 | – | 0 | 0 | 0 | 1 | 0 | 1 | 1 | 1 | 1 | 1 | 0 | 0 | 1 | 1 |
| 0x04 | T3(RT3) | 0 | – | 0 | 1 | 0 | 0 | 0 | 0 | 1 | 1 | 1 | 1 | 0 | 0 | 1 | 1 |
| 0x06 | T4(RT4) | 0 | – | 0 | 0 | 1 | 0 | 1 | 0 | 1 | 1 | 1 | 1 | 0 | 0 | 1 | 1 |
| 0x08 | T5(RT5) | 1 | – | 0 | 0 | 0 | 0 | 0 | 0 | 0 | 0 | 0 | 0 | 0 | 1 | 0 | 1 |
| 0x0a | T6(RT6) | 0 | – | 0 | 0 | 0 | 0 | 0 | 0 | 0 | 0 | 0 | 0 | 0 | 0 | 0 | 0 |
| 0x0b | T7(RT7) | 0 | – | 0 | 0 | 0 | 0 | 0 | 0 | 0 | 0 | 0 | 0 | 0 | 0 | 0 | 0 |
| 0x0c | T8(RT8) | 0 | – | 0 | 0 | 0 | 0 | 0 | 0 | 0 | 0 | 0 | 0 | 0 | 0 | 0 | 0 |
| 0x0d | T9(RT9) | 0 | – | 0 | 0 | 0 | 0 | 0 | 0 | 0 | 0 | 0 | 0 | 0 | 0 | 0 | 0 |
| 0x0e | T10(RT10) | 0 | – | 0 | 0 | 0 | 0 | 0 | 0 | 0 | 0 | 0 | 0 | 0 | 0 | 0 | 0 |
| 0x0f | T11(RT11) | 0 | – | 0 | 0 | 0 | 0 | 0 | 0 | 0 | 0 | 0 | 0 | 0 | 0 | 0 | 0 |
| 0x10 | T12(RT12) | 0 | – | 0 | 0 | 0 | 0 | 0 | 0 | 0 | 0 | 0 | 0 | 0 | 0 | 0 | 0 |

FIG. 8A

| Wait Time | | |
|---|---|---|
| D[7-4] | D[3-0] | Time [mS] |
| 0 | 5 | 4.88 |
| 15 | 3 | 237.30 |
| 15 | 3 | 237.30 |
| 15 | 3 | 237.30 |
| 0 | 5 | 4.88 |
| 0 | 0 | 0.00 |
| 0 | 0 | 0.00 |
| 0 | 0 | 0.00 |
| 0 | 0 | 0.00 |
| 0 | 0 | 0.00 |
| 0 | 0 | 0.00 |
| 0 | 0 | 0.00 |

FIG. 8B

INTEGRATED CIRCUIT DEVICE AND ELECTRONIC APPARATUS

This application claims priority based on Japanese Patent Application No. 2009-219306, filed on Sep. 24, 2009, which is incorporated in this specification.

BACKGROUND

1. Technical Field

An aspect of the present invention relates to an integrated circuit device and an electronic apparatus.

2. Related Art

An integrated circuit device for driving an electro-optical panel such as an EPD (Electrophoretic Display) panel is known. For example, an existing technology of an EPD panel is disclosed in JP-A-2009-53639.

In order to drive such an EPD panel (an Electrophoretic panel), a case may occur in which a driving voltage is sequentially changed. In such a case, an integrated circuit device (e.g., a display driver and the like) that drives the EPD panel supplies the EPD panel with a driving voltage which is sequentially changed.

However, if a control device (e.g., a MPU and the like) provided at the outside of the integrated circuit device gives an instruction for the selection of the driving voltage which is sequentially changed, the processing load of the control device is increased.

SUMMARY

An advantage of some aspects of the invention is to provide an integrated circuit device capable of reducing the processing load of a control device and sequentially driving an electro-optical panel, an electronic apparatus and the like.

According to an aspect of the invention, an integrated circuit device includes: a driving voltage output unit that outputs a driving voltage supplied to a segment electrode of an electro-optical panel; a display data storage unit that stores display data; and a driving waveform information output unit that outputs driving waveform information when a display state of the segment electrode is changed from a first display state corresponding to first display data to a second display state corresponding to second display data, wherein the driving voltage output unit outputs the driving voltage specified by the first display data and the second display data from the display data storage unit, and the driving waveform information from the driving waveform information output unit.

In one aspect of the invention, the driving voltage is specified by the first display data, the second display data, and the driving waveform information when the first display state corresponding to the first display data is changed to the second display state corresponding to the second display data, and an electro-optical panel is driven by the specified driving voltage. In this way, when the first display state is changed (transited) to the second display state, the driving voltage can be automatically and sequentially changed, resulting in the reduction and the like in the processing load of a control device.

Furthermore, in one aspect of the invention, the driving waveform information output unit may output N×N (N is an integer equal to or more than 2) driving waveform signals SWV (1, 1) to SWV (N, N), a driving waveform signal SWV (i, j) of the N×N driving waveform signals SWV (1, 1) to SWV (N, N) may indicate a driving waveform signal when the first display state is an state ($1 \leq i \leq N$) and the second display state is a j state ($1 \leq j \leq N$), and the driving voltage output unit may select an output driving waveform signal from the driving waveform signals SWV (1, 1) to SWV (N, N) based on the first display data and the second display data and output a voltage, which is specified by the output driving waveform signal, as the driving voltage.

In this way, when the first display state is changed to the second display state, an electro-optical panel can be driven using the driving voltage of the output driving waveform signal selected from the driving waveform signals SWV (1, 1) to SWV (N, N). Consequently, display characteristics with high quality can be realized.

Furthermore, in one aspect of the invention, the driving waveform information output unit may include registers RT1 to RTM (M is an integer equal to or more than 2), a register RTk of the registers RT1 to RTM may store register values for specifying signal levels of the driving waveform signals SWV (1, 1) to SWV (N, N) in a period Tk of periods T1 to TM, and the driving waveform information output unit may output the register values from the register RTk in the period Tk.

In this way, the signal levels of the driving waveform signals SWV (1, 1) to SWV (N, N) in each period are set to the register values of each register, resulting in a change in driving waveform signals. Consequently, driving waveform signals with various waveforms can be generated according to the display characteristics of an electro-optical panel.

Furthermore, in one aspect of the invention, the register RTk may store a period length-related register value for setting a length of the period Tk, and the driving waveform information output unit may set the length of the period Tk based on the period length-related register value from the register RTk.

In this way, since the lengths of driving waveform signals in each period can be set variably as well as the signal levels in each period, various driving waveform signals can be generated.

Furthermore, in one aspect of the invention, the integrated circuit device may include a plurality of I/O cells, and the driving voltage output unit may be provided for each of the plurality of I/O cells.

If the driving voltage output unit is provided for each I/O cell as described above, since efficient layout arrangement is possible, reduction and the like of the chip size of the integrated circuit device are possible.

Furthermore, in one aspect of the invention, the driving waveform information output unit may output the driving waveform information based on selection waveform information selected from a plurality of pieces of waveform information stored in a memory.

In this way, waveform information optimal for the driving of an electro-optical panel is selected, so that the electro-optical panel can be driven.

Furthermore, in one aspect of the invention, the integrated circuit device may include a temperature information acquisition unit that acquires temperature information, and the driving waveform information output unit may output the driving waveform information based on the selection waveform information selected based on the acquired temperature information.

In this way, even if temperature change occurs, waveform information corresponding to the acquired temperature is selected from a plurality of pieces of waveform information, so that an electro-optical panel is driven. Consequently, even if temperature change occurs, display characteristics with high quality can be held.

Furthermore, in one aspect of the invention, the driving waveform information output unit may output the driving waveform information based on the selection waveform information selected according to a length of a display update time of the electro-optical panel.

In this way, for example, when the display update time is long, since waveform information for use in the case where the display update time is long is selected and the electro-optical panel is driven, for example, prevention of the screen burn of the electro-optical panel and the like can be realized.

Furthermore, in one aspect of the invention, the integrated circuit device may include the memory that stores the plurality of pieces of waveform information; and a processor that selects the selection waveform information from the plurality of pieces of waveform information stored in the memory.

In this way, the processor selects the selection waveform information from the plurality of pieces of waveform information and can drive an electro-optical panel, so that a micro computer having a driver function and the like can be realized.

According to another aspect of the invention, an electronic apparatus includes: the integrated circuit device according to any one as described above; and the electro-optical panel.

BRIEF DESCRIPTION OF THE DRAWINGS

The invention will be described with reference to the accompanying drawings, wherein like numbers reference like elements.

FIGS. 6A and 6B are diagrams showing an example in which a register value for generating a driving waveform is set.

FIGS. 8A and 8B are diagrams showing an example in which a register value for generating a driving waveform is set.

DESCRIPTION OF EXEMPLARY EMBODIMENTS

Hereinafter, a preferred embodiment of the invention will be described in detail. It is noted that the embodiment described below does not unjustly limit the content of the present invention described in the scope of the claims. Furthermore, all the configurations described in the embodiment do not necessarily constitute the essential elements of the present invention.

1. Configuration

Figure 1:
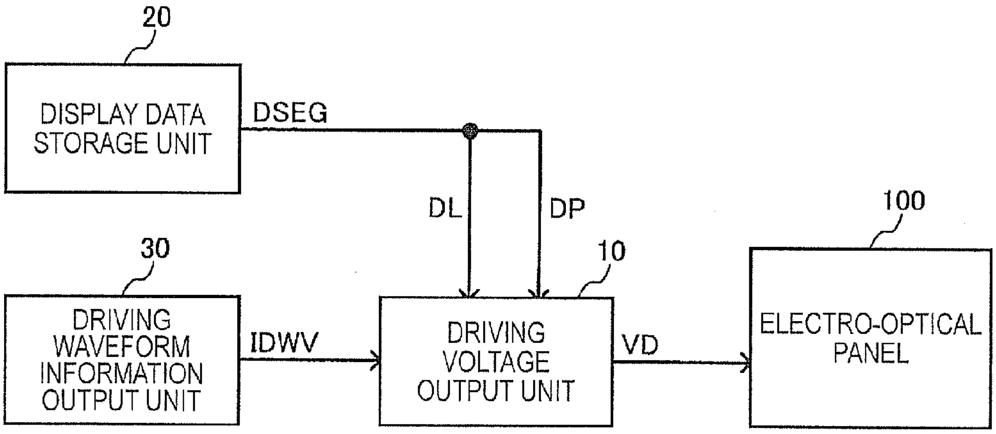
FIG. 1 is a diagram showing the configuration example of an integrated circuit device in accordance with an embodiment.

FIG. 1 is a diagram showing the configuration example of an integrated circuit device in accordance with the embodiment. The integrated circuit device of the embodiment has a driving waveform generation function of driving an electro-optical panel 100. In detail, the integrated circuit device has a function of generating a sequential driving waveform required when changing the display of the electro-optical panel 100. Waveform information for generating the driving waveform, for example, is stored in a programmable storage unit (a non-volatile memory, a ROM, a register and the like), and the driving waveform generation function is performed based on the waveform information stored in the programmable storage unit.

In order to perform such a driving waveform generation function, the integrated circuit device of the embodiment includes a driving voltage output unit 10, a display data storage unit 20, and a driving waveform information output unit 30.

The electro-optical panel 100 may include a substrate, an opposite substrate, and an electrophoretic layer provided between the substrate and the opposite substrate when employing an EPD (Electrophoretic Display) panel as an example. The electrophoretic layer (an electrophoretic sheet) is formed of a plurality of microcapsules including electrophoretic materials. The microcapsule, for example, is formed by dispersing positively charged black particles (electrophoretic materials) and negatively charged white particles (electrophoretic materials) into a dispersion liquid and encapsulating the dispersion liquid in a fine capsule.

When employing a passive type EPD panel as an example, a segment electrode (a driving electrode, a pixel electrode) may be provided on the substrate made of glass or transparent resin. Furthermore, a top plane electrode (a common electrode) may be provided on the opposite substrate (an electrophoretic sheet). In addition, the top plane electrode is formed on a transparent resin layer by using a transparent conductive material, and the electrophoretic layer is adhered to the top plane electrode by coating an adhesive and the like onto the top plane electrode, so that the electrophoretic sheet may be formed.

When an electric field is applied between the segment electrode and the top plane electrode, electrostatic force is exerted on the positively charged particles (black) and the negatively charged particles (white), which are encapsulated in the microcapsule, in the direction according to the positive and negative states of the charged particles. For example, when the segment electrode has a potential higher than that of the top plane electrode, since the positively charged particles (black) are moved toward the top plane electrode, black is displayed through pixels thereof. Meanwhile, when the top plane electrode has a potential higher than that of the segment electrode, white is displayed.

In addition, the electro-optical panel 100 is not limited to the EPD panel. For example, the electro-optical panel 100 may include an ECD (electrochromic display) panel and the like. The ECD panel performs a display operation by using a phenomenon in which a material is colored through an oxidation and reduction reaction and light transmittance changes when a voltage is applied to the ECD panel.

The driving voltage output unit 10 (a driving unit) outputs a driving voltage VD (a driving signal) supplied to the electro-optical panel 100. For example, the driving voltage output unit 10 outputs the driving voltage VD supplied to the segment electrode (an icon electrode, the driving electrode, the pixel electrode) of the electro-optical panel 100. Consequently, the driving of the passive type EPD panel and the like can be realized.

The display data storage unit 20 (an image data storage unit) stores display data DSEG (image data). The display data storage unit 20 can be realized by a register including a flip-flop and the like, or a memory such as a SRAM.

The driving waveform information output unit 30 outputs driving waveform information IDWV (driving waveform pattern information, driving voltage information). For example, the driving waveform information output unit 30 outputs the driving waveform information IDWV when the display state (grayscale) of the segment electrode of the electro-optical panel 100 is changed from a first display state (first grayscale. One of the white display and the black display) corresponding to first display data DL to a second display state (second grayscale. The other one of the white display and the black display) corresponding to second display data DP. Herein, for example, the first display data DL is display data of previous time and the second display data DP is display data of present time. For example, when the first display state is changed to the second display state, the driving waveform information IDWV defines the change in a driving waveform between the first display state and the second display state. For example, a driving voltage VD in each of a plurality of change periods is specified by the driving waveform information IDWV.

In addition, the driving voltage VD may have two values (e.g., 0V, 15V), or three values (e.g., 0V, +15V, −15V or 0V, 15V, 30V). Otherwise, the driving voltage VD may also have four values or more. Furthermore, the driving voltage VD may employ various values according to the type and the like of the electro-optical panel 100.

The driving voltage output unit 10 outputs the driving voltage VD specified by the first display data DL and the second display data DP, which are the display data DSEG (segment data) output from the display data storage unit 20, and the driving waveform information IDWV from the driving waveform information output unit 30. For example, the driving voltage output unit 10 selects an output driving waveform signal from a plurality of driving waveform signals of the driving waveform information IDWV based on the first display data DL and the second display data DP, and outputs a driving voltage VD specified (set) by the selected output driving waveform signal to the segment electrode of the electro-optical panel 100.

Figure 2A:
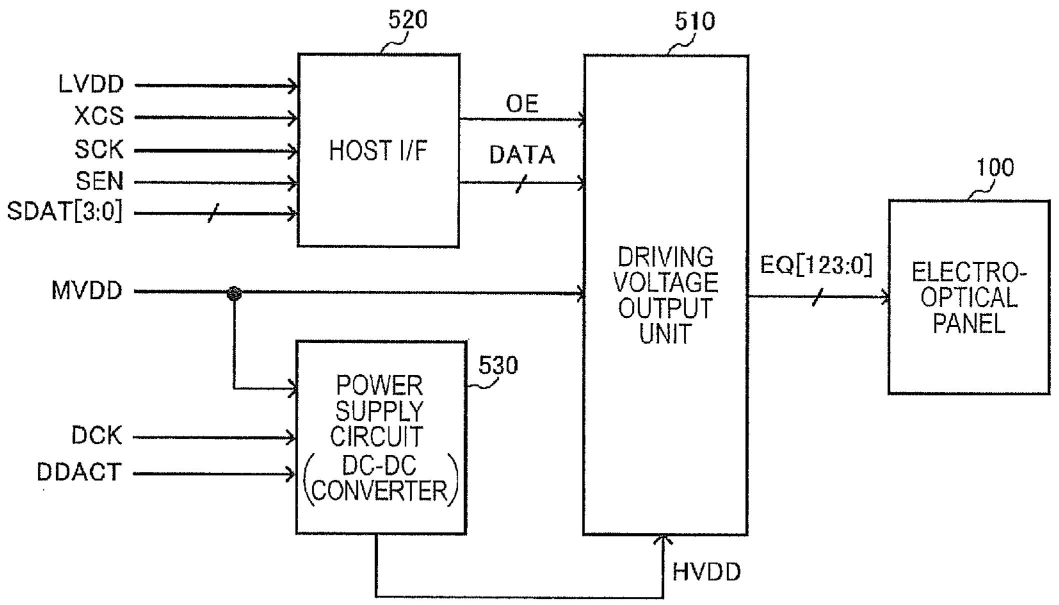
FIGS. 2A to 2C are diagrams explaining an integrated circuit device in accordance with first and second comparison examples.

FIG. 2A shows the configuration example of an integrated circuit device in accordance with a first comparison example with respect to the embodiment. The integrated circuit device includes a driving voltage output unit 510, a host I/F (interface) 520, and a power supply circuit 530 (a DC-DC converter).

The driving voltage output unit 510 outputs a driving voltage having two values or three values through terminals EQ[123:0] thereof in order to directly drive the electro-optical panel 100 such as the passive type EPD panel. For example, in the case of binary driving, the driving voltage output unit 510 outputs any one of 0V (=GND) and 15V.

The power supply circuit 530 (the DC-DC converter) generates a driving supply voltage HVDD by boosting an external supply voltage NVDD. For example, when the external supply voltage MVDD is a supply voltage of 3V from a lithium battery, the power supply circuit 530 generates a driving supply voltage HVDD of about 15V to about 18V by performing a 6 times boosting through a charge pump scheme, and supplies the generated driving supply voltage HVDD to the driving voltage output unit 510. In this way, the binary driving of 0V and 15V is possible. In addition, the power supply circuit 530 generates a voltage of 18V higher than 15V by considering the fact that a voltage drop occurs due to the influence of the driving load of EPD. Furthermore, the driving supply voltage HVDD may also be supplied from the outside.

The driving voltage output unit 510 receives the driving supply voltage HVDD from the power supply circuit 530, selects any one driving voltage of 0V and 15V, and outputs the selected driving voltage to the terminals EQ[123:0] thereof to drive the segment electrode of the electro-optical panel 100. The function of selecting the driving voltage is realized by the host I/F 520 (an MPU I/F).

For example, a logic supply voltage LVDD is supplied to the host I/F 520. Furthermore, a chip select signal XCS, a serial clock SCK, an output enable signal SEN, and data SDATA[3:0] are input from an external control device such as a MPU (a MCU) to the host I/F 520. In such a case, meaning is imparted to the data such that a logic level '0' represents 0V-driving and a logic level '1' represents 15V-driving, and driving information (0V, 15V) of the driver terminals EQ[123:0] is received from the external control device through the host I/F 520. Then, as shown in FIG. 2B, on-off control for the output of the driving voltage from the driver terminals EQ[123:0] is performed by the output enable signal SEN.

Figure 2B:
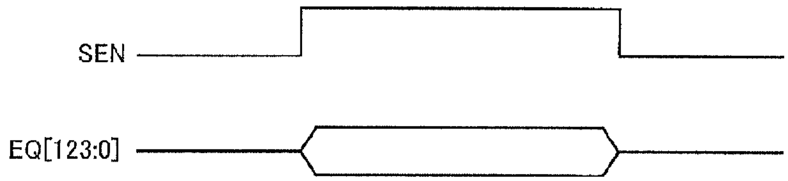
Figure 2C:
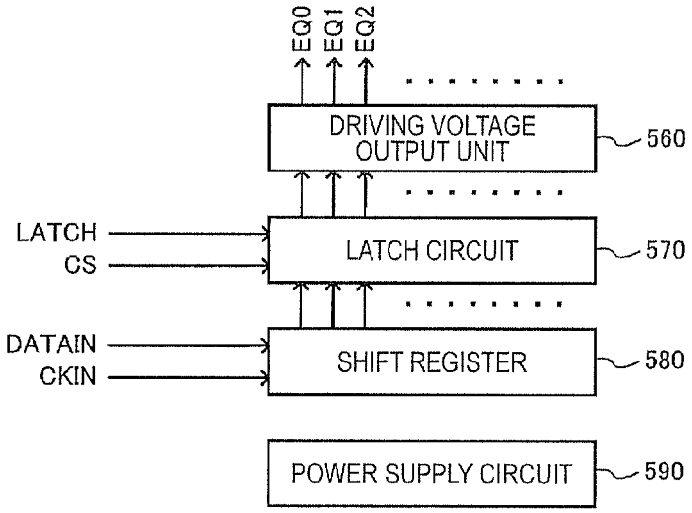

FIG. 2C shows the configuration example of an integrated circuit device in accordance with a second comparison example with respect to the embodiment. The integrated circuit device includes a driving voltage output unit 560, a latch circuit 570, a shift register 580, and a power supply circuit 590 (a DC-DC converter). DATAIN serially input from an external control device is input to the shift register 580 in synchronization with a clock CKIN. Then, when data corresponding to all driver terminals EQ1, EQ2 . . . is input to the shift register 580 as driving information, the driving information is latched by the latch circuit 570 by a latch signal LATCH. A driving voltage of 0V or 15V corresponding to the latched driving information is output to the driver terminals EQ1, EQ2 . . . from the driving voltage output unit 560, so that a segment electrode of an electro-optical panel is driven. After the driving information is latched by the latch circuit 570, next data is input to the shift register 580, driving information from the shift register 580 is latched by the latch circuit 570 again, and a driving voltage of 0V or 15V is output to the driver terminals EQ1, EQ2 . . . .

In the first comparison example and the second comparison example of FIGS. 2A to 2C as described above, the external control device such as the MPU performs sequential repetitive processing, thereby generating a driving waveform required when changing the display of the EPD panel. In detail, when a driving waveform is sequentially changed in order to change the first display state (e.g., the black display) to the second display state (e.g., the white display), the control device performs a process of inputting data to the host I/F or the shift register in each of a plurality of sequential change periods and allowing the output enable signal to be in an active state (at a high level). For example, in the case of changing a driving waveform ten times, the control device repeats a process of inputting data and allowing the output enable signal to be in an active state ten times. Therefore, the processing load of the control device may be increased, causing a burden to other processings.

Differently from the comparison examples, in the integrated circuit device of the embodiment shown in FIG. 1, the sequential driving waveform required when changing the display of the electro-optical panel 100 is automatically generated. That is, the driving waveform information output unit 30 outputs driving waveforms, which correspond to a plurality of periods when the display is changed from the first display state (e.g., the black display) to the second display state (e.g., the white display), as the driving waveform information IDWV. Then, the driving voltage output unit 10 outputs the driving voltage VD, which correspond to the plurality of periods, based on the display data DL of a previous time corresponding to the first display state, the display data DP of a present time corresponding to the second display state, and the driving waveform information IDWV. Consequently, the control device such as the MPU completes the process of inputting the data of the driving waveform and allowing the output enable signal to be in the active state without repeating the process. For example, the control device simply inputs the set of the second display data and a trigger signal, so that the sequential driving waveform for changing the display from the first display state to the second display state is automatically generated. Consequently, the processing load of the control device can be significantly reduced as compared with the first comparison example of FIG. 2A and the second comparison example of FIG. 2C.

2. Detailed Configuration

Figure 3:
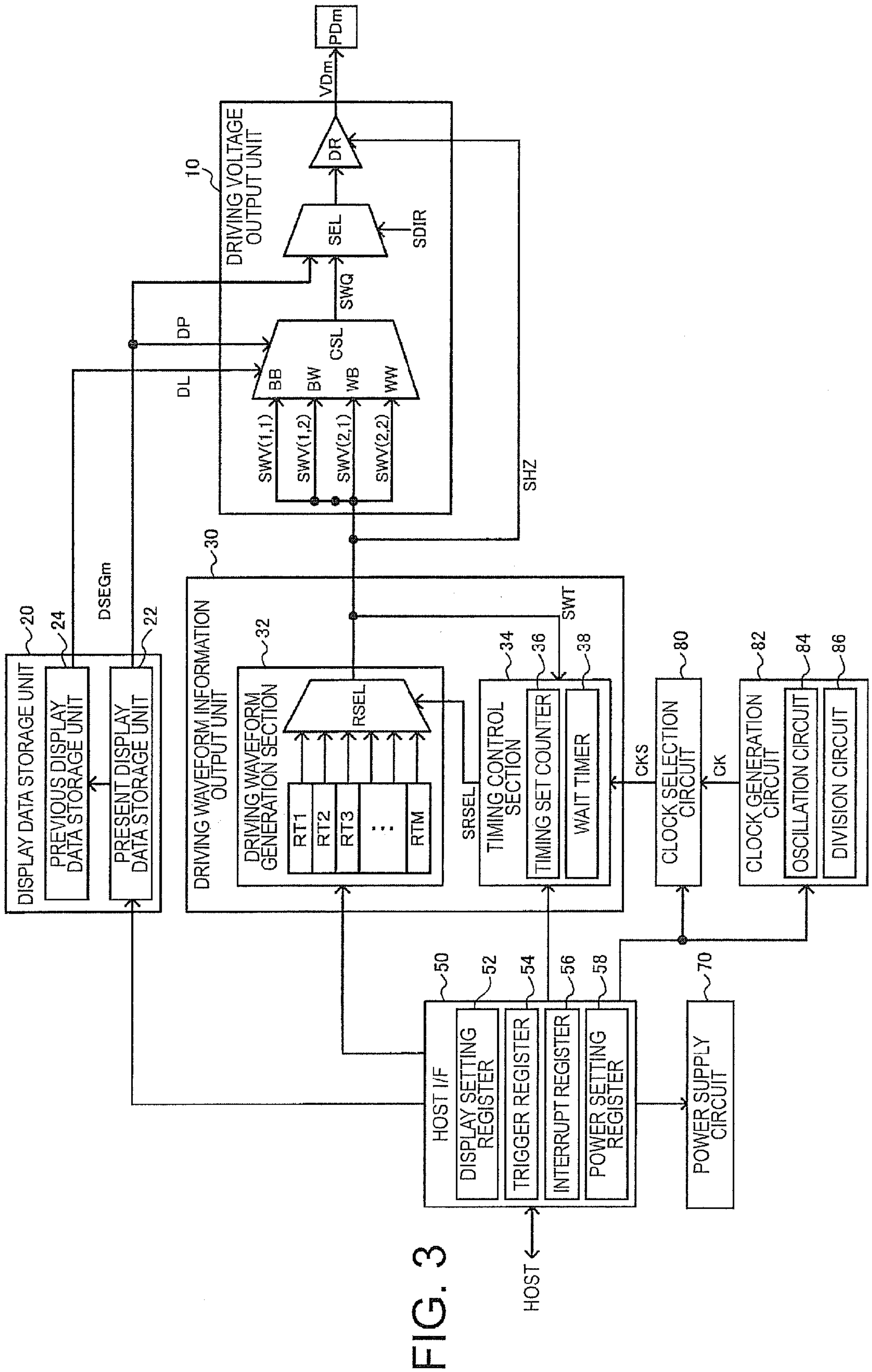
FIG. 3 is a diagram showing the detailed configuration example of an integrated circuit device in accordance with an embodiment.

FIG. 3 shows the detailed configuration example of the integrated circuit device in accordance with the embodiment. The integrated circuit device includes a host I/F (interface) 50, in addition to the driving voltage output unit 10, the display data storage unit 20, and the driving waveform information output unit 30. Furthermore, the integrated circuit device may include a power supply circuit 70, a clock selection circuit 80, and a clock generation circuit 82. In addition, various modifications such as omission of a part of these elements and addition of other elements can be made.

In the configuration example of FIG. 3, the driving waveform information output unit 30 outputs four (=2×2, N×N in a broad sense. N is an integer equal to or more than 2) driving waveform signals SWV (1, 1) to SWV (2, 2) (in a broad sense, SWV (1, 1) to SWV (N, N)). Herein, a driving waveform signal SWV (i, j) of the driving waveform signals SWV (1, 1) to SWV (2, 2) indicates a driving waveform signal when the first display state is an i state ($1 \le i \le N$) and the second display state is a j state ($1 \le j \le N$).

For example, the first display state includes two states such as black display and white display, and the second display state also includes two states such as black display and white display. SWV (1, 1) indicates a driving waveform signal when both the first display state and the second display state are black display (B), and SWV (1, 2) indicates a driving waveform signal when the first display state is black display (B) and the second display state is white display (W). In the same manner, SWV (2, 1) indicates a driving waveform signal when the first display state is white display (W) and the second display state is black display (B), and SWV (2, 2) indicates a driving waveform signal when both the first display state and the second display state are white display (W).

The driving voltage output unit 10 selects an output driving waveform signal SWQ from the driving waveform signals SWV (1, 1) to SWV (2, 2) based on the first display data DL and the second display data DP. Then, the driving voltage output unit 10 outputs a voltage, which is specified by the output driving waveform signal SWQ, as a driving voltage VDm.

For example, when the first display data DL corresponding to the first display state is black display data and the second display data DP corresponding to the second display state is black display data, the driving waveform signal SWV (1, 1) is selected. When the first display data DL is black display data and the second display data DP is white display data, the driving waveform signal SWV (1, 2) is selected. In the same manner, when the first display data DL is white display data and the second display data DP is black display data, the driving waveform signal SWV (2, 1) is selected. When both the first display data DL and the second display data DP are white display data, the driving waveform signal SWV (2, 2) is selected.

So far, the case in which the first display state and the second display state are two grayscales (two states) of the black display and the white display has been described. However, each state may be three grayscales or more. For example, when each state is an N grayscale, the driving waveform information output unit 30 outputs N×N driving waveform signals SWV (1, 1), SWV (1, 2) . . . SWV (1, N), SWV (2, N), SWV (3, N) . . . SWV (N, N).

The driving voltage output unit 10 includes a driving circuit DR, a selector SEL, and a driving waveform selection circuit CSL. The driving circuit DR, for example, outputs the driving voltage VDm of two values 0V and 15V. The driving voltage VDm is output to the electro-optical panel through a pad PDm (a terminal) of the integrated circuit device, so that the segment electrode of the electro-optical panel is driven.

In addition, the driving voltage VDm may have three values or more, and the value of the driving voltage VDm is appropriately set according to the type of the electro-optical panel (the EPD panel, the ECD panel). Furthermore, for example, a level shifter is provided to the driving circuit DR. The level shifter converts the voltage level (e.g., 3V) of the output driving waveform signal SWQ to the voltage level (e.g., 15V) of the driving voltage VDm by using a driving supply voltage (e.g., 15V) from the power supply circuit 70.

Furthermore, when a setting signal SHZ in a high impedance state from the driving waveform information output unit 30 enters an active state, the driving circuit DR sets an output terminal thereof to a high impedance state. Consequently, on-off control for the driving of the segment electrode is possible. The reason for providing such on-off control for the driving is because the high impedance state may also be necessary for a driving sequence according to the type of the EPD panel or the ECD panel, as well as a specific driving voltage of only two values or three values.

The selector SEL performs switching of a sequential mode and a direct mode. For example, when a direct mode selection signal SDIR enters an active state, an operation mode is set to the direct mode, and the signal of the display data DP from a present display data storage unit 22 is selected and output to the driving circuit DR. Consequently, as with the comparison example of FIG. 2A, the direct mode, in which the external control device such as the MPU directly performs setting of a sequential driving voltage, is realized.

Meanwhile, when the signal SDIR enters a non-active state, the output driving waveform signal SWQ from the driving waveform selection circuit CSL is selected and output to the driving circuit DR. Consequently, a sequential mode, in which the sequential driving waveform is automatically generated by the integrated circuit device, is realized.

The driving waveform selection circuit CSL selects any one of the driving waveform signals SWV (1, 1) to SWV (2, 2), which are output from the driving waveform information output unit 30 as the driving waveform information, based on the display data DL and DP from the display data storage unit 20, and outputs the selected one as the output driving waveform signal SWQ. For example, it is assumed that "DL=0 and DP=0" corresponds to the black display and "DL=1 and DP=1" corresponds to the white display. If so, when DL=0 and DP=0, SWV (1, 1) is selected. When DL=0 and DP=1, SWV (1, 2) is selected. When DL=1 and DP=0, SWV (2, 1) is selected. When DL=1 and DP=1, SWV (2, 2) is selected.

The display data storage unit 20 includes the present display data storage unit 22 that stores the display data DP of present time, and a previous display data storage unit 24 that stores the display data DL of previous time. The present display data storage unit 22, for example, has a function the same as that of the shift register 580 of FIG. 2C, and the previous display data storage unit 24 has a function the same as that of the latch circuit 570 of FIG. 2C.

For example, display data from a host is input to the present display data storage unit 22 through the host I/F 50 and is held. For example, when the number of the segment electrodes is 124, display data (segment data) corresponding to 124 is input to the present display data storage unit 22 and is held. Then, when all the 124 pieces of display data is input to the present display data storage unit 22 and the display based on the display data is ended, the display data held in the present display data storage unit 22 is transmitted to the previous display data storage unit 24 and is held (latched). In addition, the display data storage unit 20 may be realized by a flip-flop or a memory such as a SRAM.

The driving waveform information output unit 30 includes a driving waveform generation section 32 and a timing control section 34. The driving waveform generation section 32 includes registers RT1 to RTM (M is an integer equal to or more than 2), and a register selection circuit RSEL. The timing control section 34 includes a timing set counter 36 and a wait timer 38.

The registers RT1 to RTM store register values for specifying the signal levels of the driving waveform signals SWV (1, 1) to SWV (2, 2) (SWV (1, 1) to SWV (N, N)) in each of the periods T1 to TM. In detail, among the registers RT1 to RTM, the register RTk (1≤k≤M) stores register values for specifying the signal levels of the driving waveform signals SWV (1, 1) to SWV (2, 2) in the period Tk of the periods T1 to TM. For example, the register RT1 stores register values for specifying the signal levels of SWV (1, 1) to SWV (2, 2) in the period T1, and the register RT2 stores register values for specifying the signal levels of SWV (1, 1) to SWV (2, 2) in the period T2. The registers RT3 to RTM also perform the same operation. The register values of the registers RT1 to RTM are input through the host I/F 50 and written in the registers RT1 to RTM.

The register selection circuit RSEL selects any one of the register values of the registers RT1 to RTM based on a selection signal SRSEL from the timing control section 34. For example, the register value of the register RT1 is selected in the period T1 and the register value of the register RT2 is selected in the period T2. The register values are also selected in the periods T3 to TM in the same manner. Consequently, the driving waveform information output unit 30 can output the register values of the registers RT1 to RTM in the periods T1 to TM, respectively. In detail, the driving waveform information output unit 30 outputs the register value of the register RTk of the registers RT1 to RTM in the period Tk. For example, the driving waveform information output unit 30 outputs the signal level-related register value of the register RT1 in the period T1 and outputs the signal level-related register value of the register RT2 in the period T2. The signal level-related register values are also output in the periods T3 to TM in the same manner.

In addition, the registers RT1 to RTM, for example, can store period length-related register values and the like for specifying the lengths of each of T1 to TM, in addition to the signal level-related register values of the driving waveform signals SWV (1, 1) to SWV (2, 2). For example, among RT1 to RTM, the register RTk stores a period length-related register value for setting the length of the period Tk.

Then, the driving waveform information output unit 30 sets the length of the period Tk based on the period length-related register value from the register RTk. For example, the driving waveform information output unit 30 sets the length of the period T1 based on the period length-related register value from the register RT1, and sets the length of the period T2 based on the period length-related register value from the register RT2. The lengths of the periods T3 to TM are also set in the same manner.

In detail, the period length-related register values from the registers RT1 to RTM are input to the timing control section 34 through the register selection circuit RSEL as a signal SWT. Then, a wait timer value is set in the wait timer 38 by the signal SWT. The timing set counter 36 outputs the signal SRSEL obtained based on the wait timer value to the driving waveform generation section 32. In this way, the lengths of each of T1 to TM are adjusted.

Furthermore, the registers RT1 to RTM may also store register values for setting the output terminal of the driving circuit DR to be in a high impedance state. For example, in the case of setting the output terminal of the driving circuit DR to be in the high impedance state in the period Tk, a setting bit (a bit 13 of FIG. 6A which will be described later) in the high impedance state of the register RTk corresponding to the period Tk, for example, is set to ‘1’. Thus, a setting signal SHZ in the high impedance state in the period Tk becomes active.

The host I/F 50 performs an interface process with respect to a host (a CPU, a MPU, a control device). The host accesses control registers such as a display setting register 52, a trigger register 54, an interrupt register 56, and a power setting register 58 through the host I/F 50.

For example, the display setting register 52 is configured to set an instruction for selecting clocks used by various timers of the timing control section 34, an instruction for display inversion from the display state of the electro-optical panel, an instruction for all black display or all white display, an instruction for selecting the direct mode and the sequential mode, and the like. The trigger register 54 is configured to issue a trigger for stating a driving waveform generation operation. The interrupt register 56 is a register in which an interrupt flag or an interrupt mask generated after the completion of the driving waveform generation operation are set. The power setting register 58 is configured to perform various controls such as an on-off instruction of the power supply circuit 70, setting of a constant voltage circuit (a regulator), setting of a boosting multiple, and fine adjustment (contrast, trimming) of a boosting voltage.

The power supply circuit 70 generates a driving supply voltage necessary for driving the electro-optical panel based on the supply voltage supplied from a power supply terminal. For example, in the case of binary driving of 0V and 15V, the power supply circuit 70 may generate a driving supply voltage of (HVDD=15V) by boosting a supply voltage from a VDD terminal, and supply the driving supply voltage to the driving circuit DR of the driving voltage output unit 10. The driving circuit DR outputs the driving voltage VDm by using (HVDD=15V) and (VSS=0V) from a VSS terminal.

In addition, a driving supply voltage may also be supplied from an external power supply IC and the like of the integrated circuit device to a HVDD terminal. For example, since the size of the electro-optical panel is large, when a load current higher than that defined in the specification of the power supply circuit 70 is required at the time of the driving, the driving supply voltage HVDD may be supplied from the external power supply IC and the like as described above.

The clock generation circuit 82 includes an oscillation circuit 84 and a division circuit 86, and generates clocks CK with various frequencies. The clock selection circuit 80 supplies the timing control section 34 and the like with a clock CKS selected from the clocks CK of the clock generation circuit 82.

In addition, when the integrated circuit device includes a plurality of I/O cells (input/output cells), it is preferred to provide the driving voltage output unit 10 of FIG. 3 for each of the plurality of I/O cells. Herein, the I/O cell is connected to the pad (terminal) of the integrated circuit device and has at least one of an input buffer and an output buffer.

Figure 4:
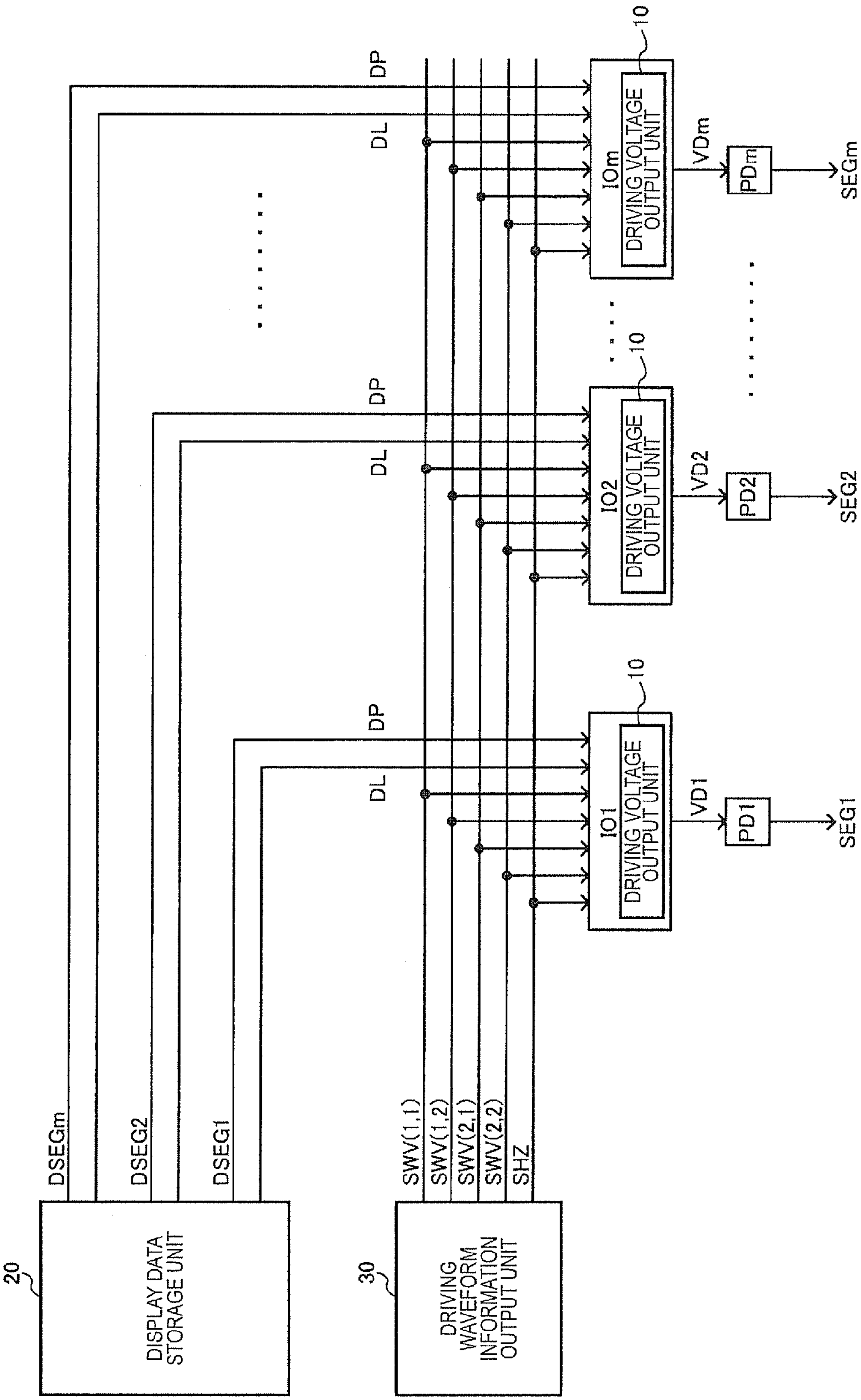
FIG. 4 is a diagram explaining a method for providing a driving voltage output unit to each I/O cell.

For example, in FIG. 4, the driving voltage output unit 10 is provided for each I/O cell of IO1 to IOm. Then, driving voltages VD1 to VDm output from the driving voltage output unit 10 of the I/O cells IO1 to IOm are output to the segment electrodes SEG1 to SEGm of the electro-optical panel through pads PD1 to PDm.

The I/O cells IO1 to IOm receive the driving waveform signals SWV (1, 1) to SWV (2, 2) from the driving waveform information output unit 30, the high impedance setting signal SHZ, and the like. Signal lines of SWV (1, 1) to SWV (2, 2) and SHZ are wired on an area (an area opposite to the pads) of chip core sides of the I/O cells, or the I/O cells, and the signals SWV (1, 1) to SWV (2, 2) and SHZ are supplied to the I/O cells from the signal lines. Furthermore, the display data DL and DP of DSEG1 to DSEGm from the display data storage unit 20 is supplied to each I/O cell of IO1 to IOm.

As shown in FIG. 4, the hard macro I/O cells provided with the driving voltage output units 10 are provided, so that layout efficiency can be improved and the chip size of the integrated circuit device can be reduced. In addition, the logic circuit of the driving voltage output unit 10 may be formed of logic circuit blocks including a gate array and a standard cell through an automatic wiring and the like, together with other logic circuits.

3. Driving Waveform

Next, a detailed example of the method for generating the driving waveform in accordance with this embodiment will be described with reference to FIGS. 5, 6A and 6B, 7, and 8A and 8B.

For example, in the EPD, white display or black display is performed according to the polarity of a driving bias applied between the segment electrode (the data electrode) and the top plane electrode (the common electrode). In addition, through the insertion of a color filter, a color can also be produced during the white display. In such a case, the white of the whit display can be replaced with the color of the filter.

In order to maintain high display quality of the EPD, it is not sufficient to apply a bias of a driving polarity necessary for simple white display or black display. For example, at the time of the change in the display of the EPD, as with the change from white to black or from black to white, a necessary bias is preferably applied to a segment to be subject to display change. In addition, for example, as with the change from black to black or from white to white, a sequential driving bias including both a positive polarity bias and a negative polarity bias is preferably applied to all segments including segments not to be subject to the display change. Moreover, when the display quality is not significant, it is not limited thereto.

Then, a sequential driving bias pattern including both the positive polarity bias and the negative polarity bias is set corresponding to the change in the display state such as from black to white, from white to black, from black to black and from white to white. In this embodiment, such a pattern will be referred to as a "driving waveform".

Figure 5:
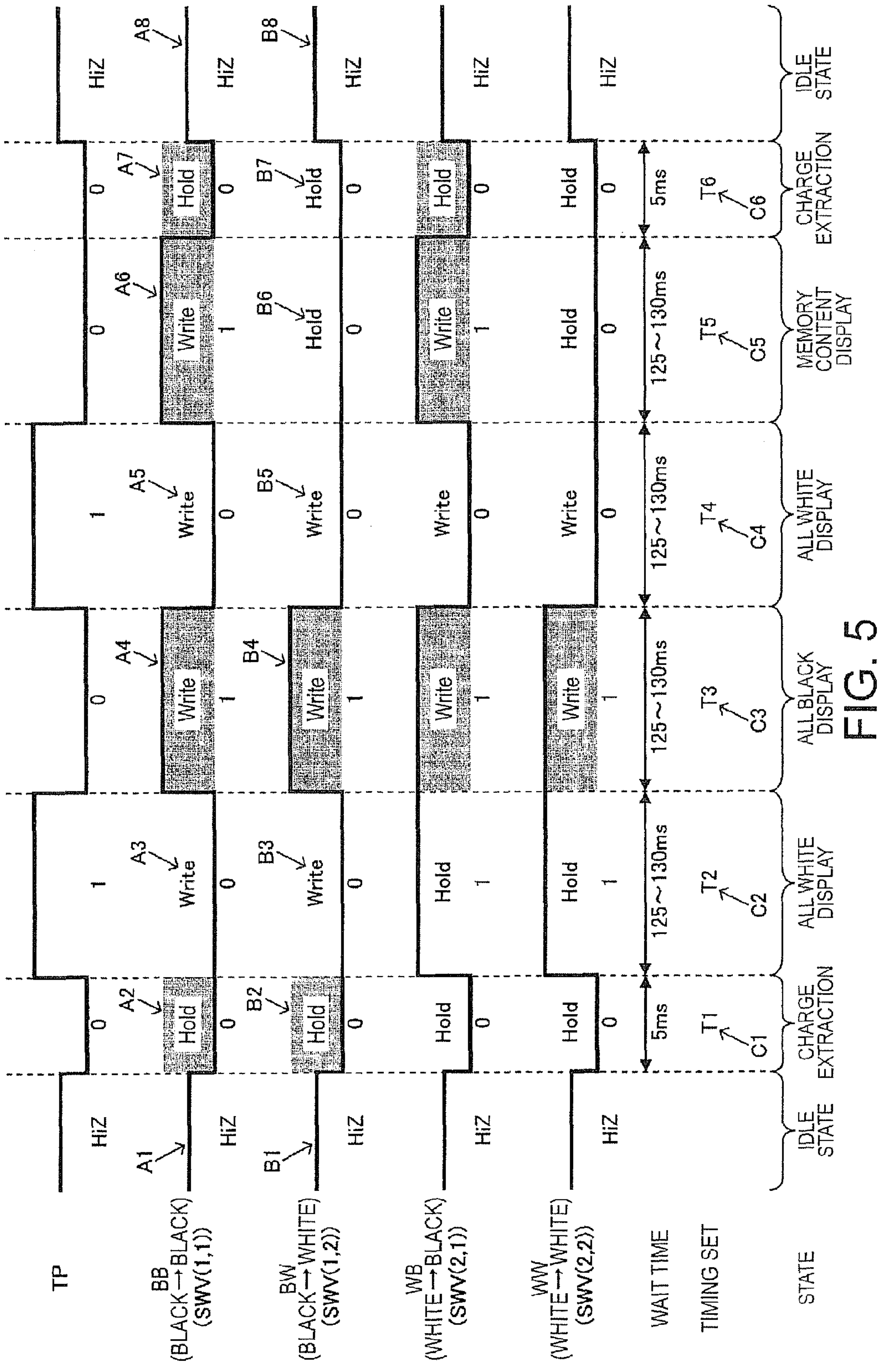
FIG. 5 is a diagram showing an example of a driving waveform for explaining the operation of an embodiment.

FIG. 5 shows an example of such a driving waveform. In FIG. 5, for example, '0' represents 0V driving and '1' represents 15V driving.

In FIG. 5, a driving waveform of two values supplied to the top plane electrode common in all the segments is TP. BB, BW, WE and WW represent driving waveforms when the display states are changed from black to black, from black to white, from white to black, and from white to white (a change from the first display state to the second display state), respectively. The driving waveforms BB, BW, WB and WW correspond to the driving waveform signals SWV (1, 1), SWV (1, 2), SWV (2, 1) and SWV (2, 2) of FIG. 3, respectively.

For example, in the idle state of A1 shown in FIG. 5, a high impedance state is set. In the charge extraction period of A2, no bias is applied because TP=0 and BB=0, and the black display is held. In A3, a positive polarity bias is applied because TP=1 and BB=0, and the black display is changed to the white display. In A4, a negative polarity bias is applied because TP=0 and BB=1, and the white display is changed to the black display. In A5, a positive polarity bias is applied because TP=1 and BB=0, and the black display is changed to the white display. In A6, TP=0 and BB=1, the contents of the memory is displayed, and the black display is performed. That is, since BB represents a driving waveform when the first display state is the black display and the second display state is the black display, the black display corresponding to the second display state (the display data DP) is performed in A6. Thereafter, the charge extraction indicated by A7 is performed, and the idle state indicated by A8 is reached.

Similarly to this, in the driving waveform BW, as indicated by B1 to B5, the idle state, the charge extraction, the white display, the black display and the white display are performed. In B6, no bias is applied because TP=0 and BW=0 and the white display set in B5 and is held, so that the contents of the memory is displayed. That is, since BW is the driving waveform when the first display state is the black display and the second display state is the white display, the white display corresponding to the second display state (the display data DP) is performed in B6. Thereafter, the charge extraction indicated by B7 is performed, and the idle state indicated by B8 is reached. This is also true for the driving waveforms WB and WW.

Furthermore, in C1 to C6, the lengths of the periods T1 to T6 are set. That is, temporal timings for changing the driving waveforms are set.

As shown in FIG. 5, before the actual contents (waveform information) of the memory are displayed, the white display and the black display are repeated in the periods set with various lengths, so that high display quality of the EPD can be realized. That is, differently from the LCD, in the EPD, when the first display state corresponding to the display data DL of previous time is changed to the second display state corresponding to the display data of present time, the driving waveform is sequentially changed over a plurality of periods. For example, A2 to A6 of FIG. 5, when the black display serving as the first display state is changed to the black display serving as the second display state, the driving waveform is changed in each of the plurality of periods. Similarly to this, in B2 to 36, when the black display serving as the first display state is changed to the white display serving as the second display state, the driving waveform is changed in each of the plurality of periods. As described above, the driving waveform is sequentially changed, resulting in the improvement of the display quality.

FIG. 6A shows an example of register values set in the registers RT1 to RTM of FIG. 3 in order to realize the driving waveforms of FIG. 5. In FIG. 6A, T1 to T12 correspond to the registers RT1 to RT12, and 16-bit width register values are set in the registers, respectively. Driving waveform information of TP, BB, BW, WB and WW is stored in bits 12, 11, 10, 9 and 8 of each register. Furthermore, length information (the counter number used by the wait timer of the timing control section) of each period is set in the bits 7, 6, 5, 4, 3, 2, 1 and 0.

The bit 15 of each register is an EOW bit and represents the end of the driving waveform. In FIG. 6A, the EOW bit of the register RT6 corresponding to the period T6 is set to 1. Thus, in FIG. 5, the driving waveform ends in the period T6.

The bits 12, 11, 10, 9 and 8 of the register RT1 corresponding to the period T1 of FIG. 6A are all set to zero. Thus, as shown in the driving waveform of FIG. 5, since TP=BB=BW=WB=WW=0, the charge extraction is performed. Furthermore, the bit 7, 6, 5, 4, 3, 2, 1 and 0 representing the wait time of the register RT1 are set to (00000101). Thus, as shown in FIG. 6B, the length of the period T1 is set to about 4.88 mS.

The bits 12, 11, 10, 9 and 8 of the register RT2 corresponding to the period T2 of FIG. 6A are all set to 1, 0, 0, 1 and 1, respectively. Thus, as shown in the driving waveform of FIG. 5, since TP=1, BB=0, BW=0, WB=1 and WW=1 in the period T2, all white display is performed. Furthermore, the bit 7, 6, 5, 4, 3, 2, 1 and 0 representing the wait time of the register RT2 are set to (10000011). Thus, as shown in FIG. 6B, the length of the period T2 is set to about 127.93 mS.

In addition, the length of the period as described above is only one example. For example, the length of the period can be arbitrarily changed by the register values set in the registers RTk and the clock selection by the clock selection circuit 80.

Figure 7:
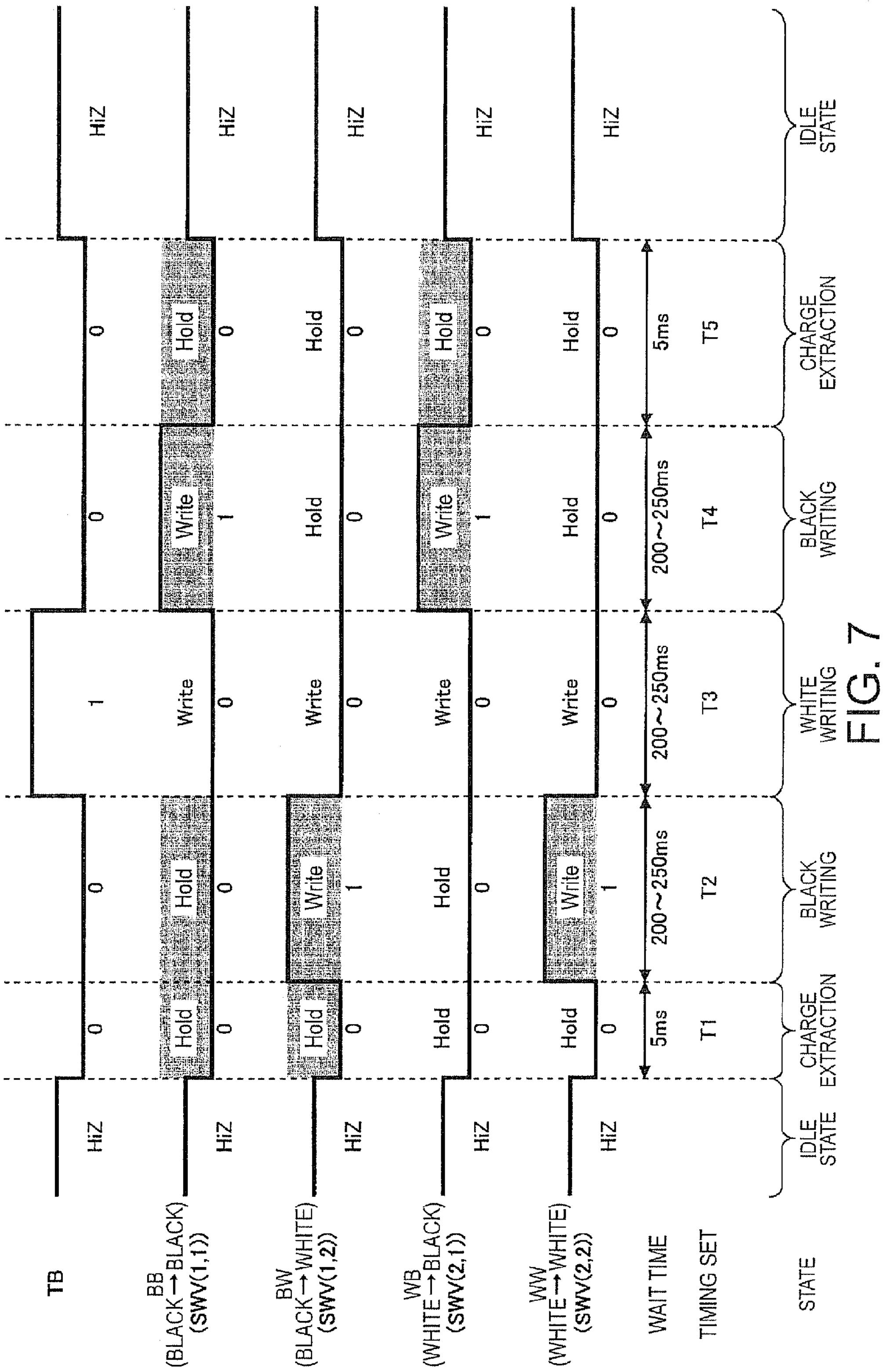
FIG. 7 is a diagram showing an example of a driving waveform for explaining the operation of an embodiment.

Furthermore, the driving waveforms are not limited to those of FIG. 5. The driving waveforms can be appropriately changed by changing the register values of the registers RTk according to the type, operation environments and the like of the EPD. For example, FIG. 7 shows an example of other driving waveforms and FIGS. 8A and 8B show a setting example of register values corresponding to the driving waveforms of FIG. 7.

In accordance with this embodiment as described above, the driving waveform signal SWQ is selected from the plurality of driving waveform signals SWV (1, 1) to SWV (2, 2) based on the first display data DL and the second display data DP, and the driving voltage VDm specified by the selected driving waveform signal SWQ is output. Thus, when the first display state corresponding to the first display data DL is changed to the second display state corresponding to the second display data DP, the segment electrode of the electro-optical panel can be driven using the driving voltage of a driving waveform signal which is, for example, sequentially changed. Consequently, display characteristics with high quality can be realized. Furthermore, in this embodiment, the sequential driving waveform signal is automatically generated, resulting in the reduction in the processing load of the host (the control device).

In addition, in this embodiment, each of the registers RT1 to RTM stores a register value for specifying the signal level of the driving waveform signal in each period. Then, the register values are output from each register in each period. Thus, the signal levels of the driving waveform signals in each period are set to the register values of each register, so that the driving waveform signals can be changed. Consequently, driving waveform signals with various waveforms can be generated according to the display characteristics of the electro-optical panel.

Moreover, in this embodiment, the lengths of each period can also be set based on the period length-related register values stored in each register. Consequently, since the lengths of each period of a driving waveform signal can also be variably set as well as the signal levels in each period, various driving waveform signals can be further generated.

4. Modified Examples

Figure 9:
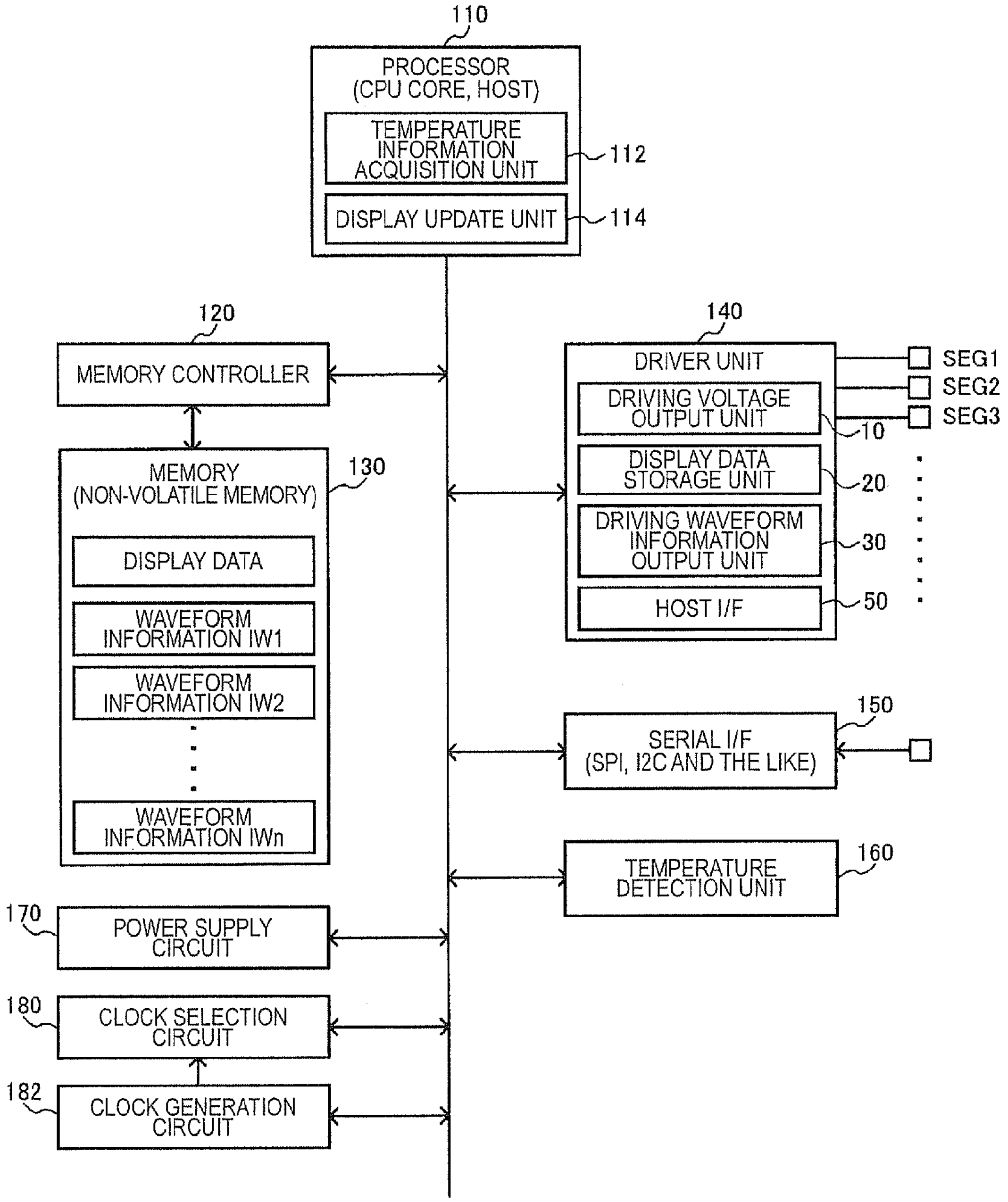
FIG. 9 is a diagram showing a first modified example of an integrated circuit device in accordance with an embodiment.

Next, various modified examples of this embodiment will be described. FIG. 9 shows a first modified example of the integrated circuit device in accordance with this embodiment. The first modified example is an application example of a microprocessor having a driver function. The integrated circuit device includes a processor 110, a memory controller 120, a memory 130, a driver unit 140, a serial I/F 150, a temperature detection unit 160, a power supply circuit 170, a clock selection circuit 180, and a clock generation circuit 182. In addition, various modifications such as omission of a part of these elements and addition of other elements can be made.

The processor 110 (a CPU core, a host) performs various control processes and operation processes, and includes a temperature information acquisition unit 112, and a display update unit 114. The temperature information acquisition unit 112, for example, acquires temperature information (environmental temperature) detected by the temperature detection unit 160. The display update unit 114 performs a display change process of the electro-optical panel. The functions of the temperature information acquisition unit 112 and the display update unit 114, for example, can be realized by hardware of the processor 110 and firmware (software) executed by the processor 110. For example, the memory 130 stores firmware for executing the processes of the temperature information acquisition unit 112 and the display update unit 114, and the processor 110 operates based on this firmware, so that the functions of the temperature information acquisition unit 112 and the display update unit 114 are realized.

The memory controller 120 performs an access control such as a reading control and a writing control of the memory 130. The memory 130, for example, includes a non-volatile memory such as a flash memory. In addition, the memory 130 may also include a mask ROM.

The driver unit 140 is configured to drive the electro-optical panel and includes a driving voltage output unit 10, a display data storage unit 20, a driving waveform information output unit 30, and a host I/F 50.

The serial I/F 150 realizes a serial interface such as SPI and I2C with respect to the outside. The temperature detection unit 160 detects temperature by using a temperature sensor and the like. For example, the temperature detection unit 160 detects peripheral temperature by measuring information on the resistance ratio of a thermistor and a reference resistor. The power supply circuit 170 generates and supplies various supply voltages such as driving supply voltages. The clock generation circuit 182 generates clocks with various frequencies and the clock selection circuit 180 selects the clocks generated by the clock generation circuit 182.

In FIG. 9, the memory 130 stores a plurality of pieces of waveform information IW1 to IWn. When the memory 130 is a non-volatile memory such as a flash memory, the waveform information IW1 to IWn is programmed in advance in the non-volatile memory. Then, the processor 110 selects waveform information from the waveform information IW1 to IWn stored in the memory 130 through the memory controller 120. The selection waveform information, which is the selected waveform information, is transmitted to the driver unit 140. The driving waveform information output unit 30 of the driver unit 140 outputs driving waveform information based on the selection waveform information. For example, the selection waveform information is set as the register values (signal level or period length-related register values) of the registers RT1 to RTM of FIG. 3.

As described above, since the waveform information IW1 to IWn is stored in the memory 130 which is accessible by the processor 110, when a driving waveform signal is generated using waveform information, required waveform information can be easily selected and transmitted.

In addition, the waveform information IW1 to IWn, for example, can be loaded from an external device (an external memory and the like) by using the serial I/F 150 or a general purpose input/output terminal, and written in the memory 130.

Furthermore, when it is apparent that an integrated circuit device (a custom IC and the like) does not require a plurality of pieces of waveform information, only determined waveform information may be stored in the memory 130.

In FIG. 9, the processor 110 serving as a host transmits the waveform information to the driver unit 140, and then performs setting of various registers 52, 54, 56 and 58 described in FIG. 3. For example, the processor 110 performs basic setting such as setting of a timer clock for determining timing time of a driving waveform, voltage setting and boosting setting of the power supply circuit 70, and enable and disable setting of an interrupt. Further, when an oscillation circuit necessary for generating the timer clock is different from an oscillation circuit serving as a clock source of the processor 110, the operation of the oscillation circuit is set to be on.

Various types of settings as described above are realized by software (firmware) executed by an initial setting routine of the processor 110. In addition, after the initial setting is performed, it is possible to allow the above setting to be unnecessary. After the initial setting, it is possible to change the display of the electro-optical panel by using a software process similar to that of a normal LDC driver and the like. In detail, the processor 110 writes display data in the display data storage unit 20 of the driver unit 140. Then, the processor 110 sets a driving start trigger with respect to the trigger register 54 described in FIG. 3. Thus, the sequential driving waveform as shown in FIG. 5 is generated, and the segment electrode of the electro-optical panel is driven, resulting in a change in the display of the electro-optical panel.

In addition, in the case of fixed display contents, as shown in FIG. 9, display data corresponding to the fixed display contents is stored in advance in the memory 130. For example, in the case of displaying a specific numeral in 7-segment display, display data corresponding to a font of the specific numeral is stored in advance. Then, the processor 110 transmits the display data to the display data storage unit 20 of the driver unit 140, resulting in the realization of a change in the display of the electro-optical panel.

In FIG. 9, for example, the temperature information acquisition unit 112 acquires peripheral temperature information by using the temperature detection unit 160. If so, the driving waveform information output unit 30 of the driver unit 140 outputs driving waveform information based on selection waveform information selected based on the acquired temperature information. In detail, the processor 110 selects waveform information corresponding to the acquired temperature information from the waveform information IW1 to IWn stored in the memory 130. Then, the processor 110 transmits the selected waveform information to the driver unit 140, and the sequential driving waveform is generated based on this waveform information, so that the electro-optical panel is driven.

In this way, even if the peripheral temperature changes, waveform information optimal at the temperature at that time is selected from the plurality of pieces of waveform information IW1 to IWn, so that the electro-optical panel is driven. Consequently, even if the peripheral temperature changes, display characteristics with high quality can be held.

Furthermore, in FIG. 9, the display update unit 114 performs a process for updating the display of the electro-optical panel. Then, the driving waveform information output unit 30 of the driver unit 140, for example, outputs driving waveform information based on waveform information selected according to the length of the display update time of the electro-optical panel. For example, when the display update time is long and the like, it is highly probable that high display quality may not be held even if the electro-optical panel is driven using normal waveform information.

In this regard, in FIG. 9, for example, when the display update time is long, waveform information stored in the memory 130 in preparation for the case where the display update time is long is selected and transmitted to the driver unit 140, so that the electro-optical panel is driven. For example, when the display update time exceeds a predetermined threshold value, waveform information (e.g., FIG. 7) for preventing screen burn representing the repetition of black display and white display is selected and transmitted to the driver unit 140, so that the trigger of display change is implemented. In this way, even if the display of the electro-optical panel is not updated for a long time, since driving based on the screen burn-prevention waveform information is intermittently performed, the screen burn of the electro-optical panel can be prevented.

Figure 10:
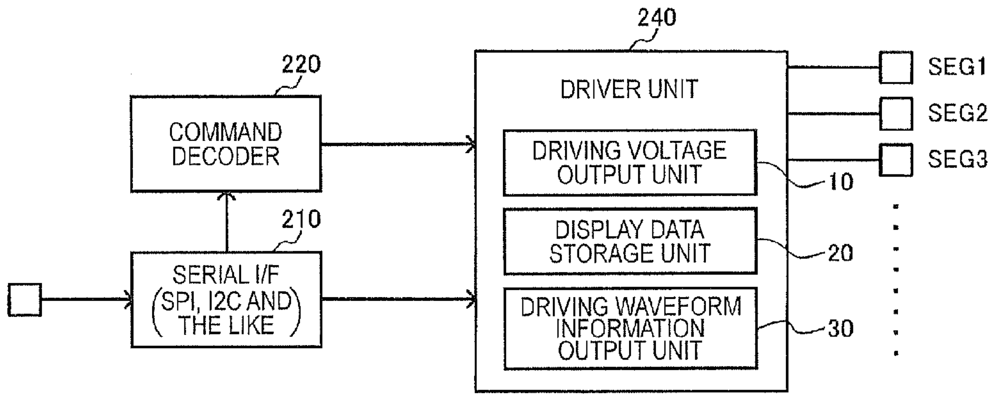
FIG. 10 is a diagram showing a second modified example of an integrated circuit device in accordance with an embodiment.

FIG. 10 shows a second modified example of the integrated circuit device in accordance with this embodiment. The second modified example is an application example of a display driver. The integrated circuit device includes a serial I/F 210, a command decoder 220, and a driver unit 240. In addition, various modifications such as omission of a part of these elements (e.g., a power supply circuit, a timing control section) and addition of other elements can be made.

The serial I/F 210 serves as an interface for inputting various commands, display data and waveform information from a control device such as a MPU. The command decoder 220 decodes and interprets a command issued by the control device. The driver unit 240 drives segment electrodes SEG1, SEG2 . . . of the electro-optical panel based on the issued command, the display data and the waveform information. In addition, instead of the serial I/F 210, a parallel I/F and the like may also be provided.

5. Electronic Apparatus

Figure 11:
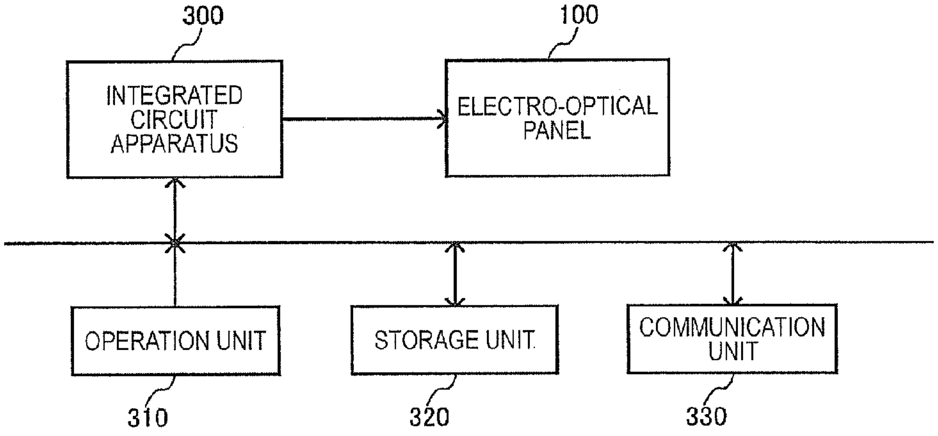
FIG. 11 is a diagram showing the configuration example of an electronic apparatus in accordance with an embodiment.

FIG. 11 shows a configuration example of an electronic apparatus including an integrated circuit device 300 in accordance with this embodiment. The electronic apparatus includes the electro-optical panel 100, the integrated circuit device 300, an operation unit 310, a storage unit 320, and a communication unit 330. In addition, various modifications such as omission of a part of these elements and addition of other elements can be made.

The integrated circuit device 300 includes a display driver for driving the electro-optical panel 100, a macro computer having a driver function, and the like.

The electro-optical panel 100 is configured to display various images (information) and for example, includes an EPD panel, an ECD panel and the like. The operation unit 310 is configured to allow a user to input various pieces of information, and can be realized by various buttons, a keyboard and the like. The storage unit 320 is configured to store various pieces of information, and can be realized by a RAM, a ROM and the like. The communication unit 330 is configured to perform a communication process with respect to the outside.

In addition, an electronic apparatus realized by this embodiment, for example, may include various apparatuses such as an electronic card (a credit card, a point card and the like), an electronic paper, a remote controller, a timepiece, a mobile phone, a PDA and a calculator.

So far, the details of the embodiments have been described in the above, but skilled in the art easily understands that any modifications can be available within the scope of the invention and its advantage. Namely, such modifications are within the range of the invention. For example, in the specification and drawings, some terminologies (an electro-optical panel and the like) were used at least one time accompanied with more broader or same meaning, but different terminologies (an EPD panel and the like). These terminologies can be replaced with different terminologies in any part of the specification and drawings. Furthermore, the configuration and operation of an integrated circuit device and an electronic apparatus are not also limited to the embodiment. For example, various modifications can be made.

What is claimed is:

1. An integrated circuit device comprising:

a plurality of driving voltage output units that each output a driving voltage supplied to a segment electrode of an electro-optical panel, each of the driving voltage output units including a selector for switching between a sequential mode and a direct mode;

a display data storage unit that stores display data including first display data and second display data; and a driving waveform information output unit that outputs a plurality of driving waveform signals corresponding to a display state of the segment electrode, wherein the driving voltage output units each receive a plurality of the driving waveform signals and the first and second display data, and each of the driving voltage output units select individual ones of the driving waveform signals as the driving voltage based on the first display data and the second display data from the display data storage unit, when the selector is enabled to select the direct mode, the first display data is output by the corresponding driving voltage output unit, and when the selector is enabled to select the sequential mode, the corresponding driving voltage output unit selects the individual ones of the driving waveform signals as the driving voltage based on the first display data and the second display data from the display data storage unit.

2. The integrated circuit device according to claim 1, wherein the driving waveform information output unit outputs N×N (N is an integer equal to or more than 2) driving waveform signals SWV (1, 1) to SWV (N, N), a driving waveform signal SWV (i, j) of the N×N driving waveform signals SWV (1, 1) to SWV (N, N) indicates a driving waveform signal when the first display state is an i state ($1 \leq i \leq N$) and the second display state is a j state ($1 \leq j \leq N$), and the driving voltage output units select an output driving waveform signal from the driving waveform signals SWV (1, 1) to SWV (N, N) based on the first display data and the second display data and output a voltage, which is specified by the output driving waveform signal, as the driving voltage.

3. The integrated circuit device according to claim 2, wherein the driving waveform information output unit includes registers RT1 to RTM (M is an integer equal to or more than 2), a register RTk ($1 \leq k \leq M$) of the registers RT1 to RTM stores register values for specifying signal levels of the driving waveform signals SWV (1, 1) to SWV (N, N) in a period Tk of periods T1 to TM, and the driving voltage output units output the driving voltage based on the register values for specifying the signal levels.

4. The integrated circuit device according to claim 2, wherein the driving waveform information output unit includes registers RT1 to RTM (M is an integer equal to or more than 2), a register RTk ($1 \leq k \leq M$) of the registers RT1 to RTM stores register values for specifying signal levels of the driving waveform signals SWV (1, 1) to SWV (N, N) in a period Tk of periods T1 to TM, and the driving waveform information output unit outputs the register values from the register RTk in the period Tk.

5. The integrated circuit device according to claim 3, wherein the register RTk stores a period length-related register value for setting a length of the period Tk, and the driving waveform information output unit sets the length of the period Tk based on the period length-related register value from the register RTk.

6. The integrated circuit device according to claim 1, further comprising a plurality of I/O cells, and a corresponding one of the driving voltage output units is provided for each of the plurality of I/O cells.

7. The integrated circuit device according to claim 1, wherein the driving waveform information output unit outputs the driving waveform information based on selection waveform information selected from a plurality of pieces of waveform information stored in a memory.

8. The integrated circuit device according to claim 7, further comprising a temperature information acquisition unit that acquires temperature information, and the driving waveform information output unit outputs the driving waveform information based on the selection waveform information selected based on the acquired temperature information.

9. The integrated circuit device according to claim 7, wherein the driving waveform information output unit outputs the driving waveform information based on the selection waveform information selected according to a length of a display update time of the electro-optical panel.

10. The integrated circuit device according to claim 7, further comprising:

the memory that stores the plurality of pieces of waveform information; and a processor that selects the selection waveform information from the plurality of pieces of waveform information stored in the memory.

11. An electronic apparatus comprising:

the integrated circuit device according to claim 1; and the electro-optical panel.

* * * * *